United States Patent
Miao

(10) Patent No.: US 7,263,133 B1
(45) Date of Patent: Aug. 28, 2007

(54) MIMO-BASED MULTIUSER OFDM MULTIBAND FOR ULTRA WIDEBAND COMMUNICATIONS

(76) Inventor: George J. Miao, 2 Inverness Dr., Marlboro, NJ (US) 07746

( * ) Notice: Subject to any disclaimer, the term of this patent is extended or adjusted under 35 U.S.C. 154(b) by 807 days.

(21) Appl. No.: 10/653,651

(22) Filed: Sep. 2, 2003

(51) Int. Cl.
H04B 7/02 (2006.01)

(52) U.S. Cl. .............. 375/267; 375/146; 375/260; 375/349; 375/130; 370/208; 714/755

(58) Field of Classification Search .......... 375/146, 375/267, 349, 130; 370/208; 714/755
See application file for complete search history.

(56) References Cited

U.S. PATENT DOCUMENTS

| | | | |
|---|---|---|---|
| 6,744,832 B2 * | 6/2004 | Miao | 375/349 |
| 6,985,434 B2 * | 1/2006 | Wu et al. | 370/208 |
| 7,031,371 B1 * | 4/2006 | Lakkis | 375/146 |
| 7,046,716 B1 * | 5/2006 | Miao | 375/130 |
| 7,095,709 B2 * | 8/2006 | Walton et al. | 370/208 |
| 2002/0172147 A1 * | 11/2002 | Matsumoto | 370/208 |
| 2003/0072382 A1 * | 4/2003 | Raleigh et al. | 375/267 |
| 2005/0097427 A1 * | 5/2005 | Matsumoto et al. | 714/755 |

OTHER PUBLICATIONS

U.S. Appl. No. 10/643,302—Claims Only.*
Lee et al.; Performance Analysis of Down Link Time Switched Transmit Diversity (TSTD) in W-CDMA system; IEEE 2000; pp. 561-565.*
Li et al.; Transmitter Diversity forOFDM Systems and its Impacts on High-Rate Wireless Networks; IEEE 1999; pp. 534-538.*
Blum et al.; Improved Space-Time Coding for MIMO-OFDM Wireless Communications; IEEE Transcation on Communications, vol. 49, No. 11; Nov. 2001; pp. 1873-1878.*

* cited by examiner

*Primary Examiner*—Chieh M. Fan
*Assistant Examiner*—Sudhanshu C. Pathak

(57) ABSTRACT

A MIMO-based multiuser OFDM multiband of UWB communications is presented to meet FCC emission limitations for indoor UWB operations. The present UWB system divides a single UWB frequency band of 7.5 GHz into eleven frequency bands as a multiband. Each frequency band has 650-MHz frequency bandwidth, uses an OFDM with multicarrier, and employs different modulations. The present UWB system can be programmable not only to transmit different data rates in a relatively longer distance but also to avoid interference with other devices by controlling the multiband and/or some of the multicarrier within each of the OFDM. The present UWB system can transmit a very high data rate up to 11 Gbps approximately.

17 Claims, 13 Drawing Sheets

MIMO-BASED MULTIUSER OFDM MULTIBAND FOR ULTRA WIDEBAND COMMUNICATIONS

BACKGROUND

This invention is generally relative to a Multiple-Input-Multiple-Output (MIMO)-base multiuser Orthogonal Frequency Division Multiplexing (OFDM) multiband of Ultra Wideband (UWB) Communications for short-distance wireless broadband communications.

U.S. Federal Communications Commission (FCC) released a revision of Part 15 of Commission's rules regarding UWB transmission systems to permit marketing and operation of certain types of new products incorporating UWB technology on Apr. 22, 2002. With appropriate technologies, UWB device can operate using spectrum occupied by existing radio service without causing interference, thereby permitting scarce spectrum resources to be used more efficiently. Adapting UWB technology offers significant benefits for Government, public safety, businesses, and consumers under an unlicensed basis of operation spectrum.

In general, FCC is adapting unwanted emission limits for UWB communication devices that are significantly more stringent than those imposed on other Part 15 devices. For indoor UWB operations, FCC allows a wide variety of the UWB communication devices, such as high-speed home and business networking devices, subject to certain frequency and power limitations. An emission limitation is −10 dBm for the indoor UWB operations. The UWB communication devices must operate in the frequency band from 3.1 GHz to 10.6 GHz. In addition, the UWB communication devices should satisfy the Part 15.209 emission-mask limitations for the frequency band below 960 MHz and above 960 MHz.

For indoor UWB communication devices, Table 1 lists the FCC restrictions of the emission masks (dBm) along with the frequencies (GHz) as follows:

TABLE 1

| Frequency (MHz) | EIRP (dBm) |
|---|---|
| 0-960 | −41.3 |
| 960-1610 | −75.3 |
| 1610-1990 | −53.3 |
| 1990-3100 | −51.3 |
| 3100-10600 | −41.3 |
| Above 10600 | −51.3 |

FCC defines an UWB communication device device where a fractional bandwidth (FB) is greater than 0.25 given by, $$FB = 2\left(\frac{f_H - f_L}{f_H + f_L}\right), \quad (1)$$

where $f_h$ is the upper frequency of −10 dBm emission point, and $f_L$ is the lower frequency of −10 dBm emission point.

The center frequency $F_c$ of an UWB transmission system is obtained by using an average of the upper and lower −10 dBm emission points as follows:

$$F_c = \frac{f_H + f_L}{2}. \quad (2)$$

Furthermore, a minimum frequency bandwidth of 500 MHz must be used for any indoor UWB communication devices regardless of the center frequency.

In indoor environments, the UWB communication devices can be used for wireless broadband communications within a short-distance range, particularly for a very high-speed data transmission suitable for broadband access to networks, a device access to any devices, and Internet access to high-definite television, etc.

An UWB frequency bandwidth of 7.5 GHz from 3.1 GHz to 10.6 GHz is used as a single frequency band, an analog-to-digital (A/D) and a digital-to-analog (D/A) converter must operate at a very-high sampling rate F, so that an UWB communication transceiver can be directly implemented in a digital domain. However, this leads to a very-high requirement for the A/D and D/A converter in an UWB transmitter and receiver. Presently, developing such a very high-speed A/D and D/A converter may not be possible with a reasonable cost, thereby having a difficult problem to apply the A/D and the D/A converter for the UWB communication transceiver based on the single frequency band. On the other hand, a single frequency band-based UWB communication transceiver may not have flexibility and scalability for transmitting and receiving a user data. In addition, the single frequency band-based UWB communication transceiver may have interference with a Wireless Local Area Network (WLAN) 802.11a transceiver without using a special filter system since the WLAN 802.11a transceiver operates at a lower U-NII frequency range from 5.15 GHz to 5.35 GHz and at an upper U-NII upper frequency range from 5.725 GHz to 5.825 GHz.

Furthermore, since FCC is adapting unwanted emission limits for indoor UWB communication devices that are significantly more stringent than those imposed on other Part 15 devices, transmitting distance of the indoor UWB communication devices is limited if employing a convention approach, such as a single antenna for the single frequency band in the UWB communication devices. As a result, transmitting distance is approximately in a range of one meter to ten meters depending on a transmitting data rate.

An OFDM is an orthogonal multicarrier modulation technique that has been extensively used in a digital audio and video broadcasting, and a WLAN 802.11a. The OFDM has its capability of multifold increasing symbol duration. With increasing the number of subcarriers, the frequency selectivity of a channel may be reduced so that each subcarrier experiences flat fading. Thus an OFDM approach has shown in a particular useful for wireless broadband communications over fading channels.

A direct sequence spread spectrum (DSSS) is to use a pseudorandom (PN) sequence to spread a user signal. The PN sequence is an ordered stream of binary ones and zeros that referred to as chips rather than bits. The DSSS can be used to separate signals coming from multiuser. Thus the multiple access interference (MAI) among multiuser can be avoided if a set of PN sequences is designed with as low crosscorrelation as possible.

A MIMO is a multiple-input-multiple-output as a wireless link and is also a space-time signal processing so that a natural dimensional of transmitting data is complemented with a spatial dimension inherent in the use of multiple spatially distributed antennas. Thus, the MIMO is able to turn multipath propagation into a benefit for a user. In a MIMO communication system, signals on transmitter antennas at one-end and receiver antennas at the other-end are integrated in such a way that the quality of bit error rate (BER), data rate of communication for each user, or transmitting distance is improved, thereby enhancing a communication network's quality of service.

A MIMO-based multiuser OFDM multiband for an UWB communication transceiver system is disclosed herein according to some embodiments of the present invention. The present invention uses eleven frequency bands as a multiband, each of the frequency bands having 650 MHz frequency bandwidths. Each of the frequency bands employs an OFDM modulation for a multiuser UWB communication transceiver. A base station of UWB communications employs eleven antennas while a mobile station of the UWB communications uses two antennas. A solution of MIMO-based OFDM multiband allows using a set of low-speed A/D and D/A converters in parallel. A unique of the PN sequences is assigned to each user so that multiuser can share the same frequency band or the multiband to transmit and receive information data. An orthogonal sequence is also used to spread the data within each of the frequency bands, thereby leading to multiband orthogonality. On the other hand, since the OFDM is an orthogonal multicarrier modulation, subcarriers within each of the frequency bands may be flexibility turned on or off avoiding the interference with the WLAN 802.11a during the indoor UWB operations. In addition, the MIMO-based multiuser OFDM multiband of the UWB communication transceiver system improves the capability of transmitting very-high data rate in a much longer distance than the convention approach does. Moreover, the present invention of the MIMO-based multiuser OFDM multiband of the UWB communication transceiver system has a scalability to transmit and receive the data rate of 2.770 Gbps by using one of the frequency bands up to the data rate of 11.082 Gbps by using all of the eleven frequency bands.

Thus, there is a continuing need of the MIMO-based multiuser OFDM multiband of the UWB communication transceiver system for transmitting a very-high data rate in a greater distance range in indoor environments.

SUMMARY

In accordance with one aspect, a MIMO-based multiuser OFDM multiband of an UWB base station communication transmitter comprises a multiuser encoding and spreading unit, a polyphase-based multiband, an inverse fast Fourier transform (IFFT) unit, a filtering and spreading unit, a MIMO-based multiband modulation and multicarrier radio unit, and a multiple antenna unit.

Other aspects are set forth in the accompanying detailed description and claims.

DETAILED DESCRIPTION

Some embodiments described herein are directed to the MIMO-based multiuser OFDM multiband of the UWB communication transceiver system during the indoor UWB operation. The MIMO-based multiuser OFDM multiband of the UWB communication transceiver system may be implemented in hardware, such as in an Application Specific Integrated Circuits (ASIC), digital signal processor, field programmable gate array (FPGA), software, or a combination of hardware and software.

MIMO-Based Multiuser OFDM multiband UWB System

Figure 1:
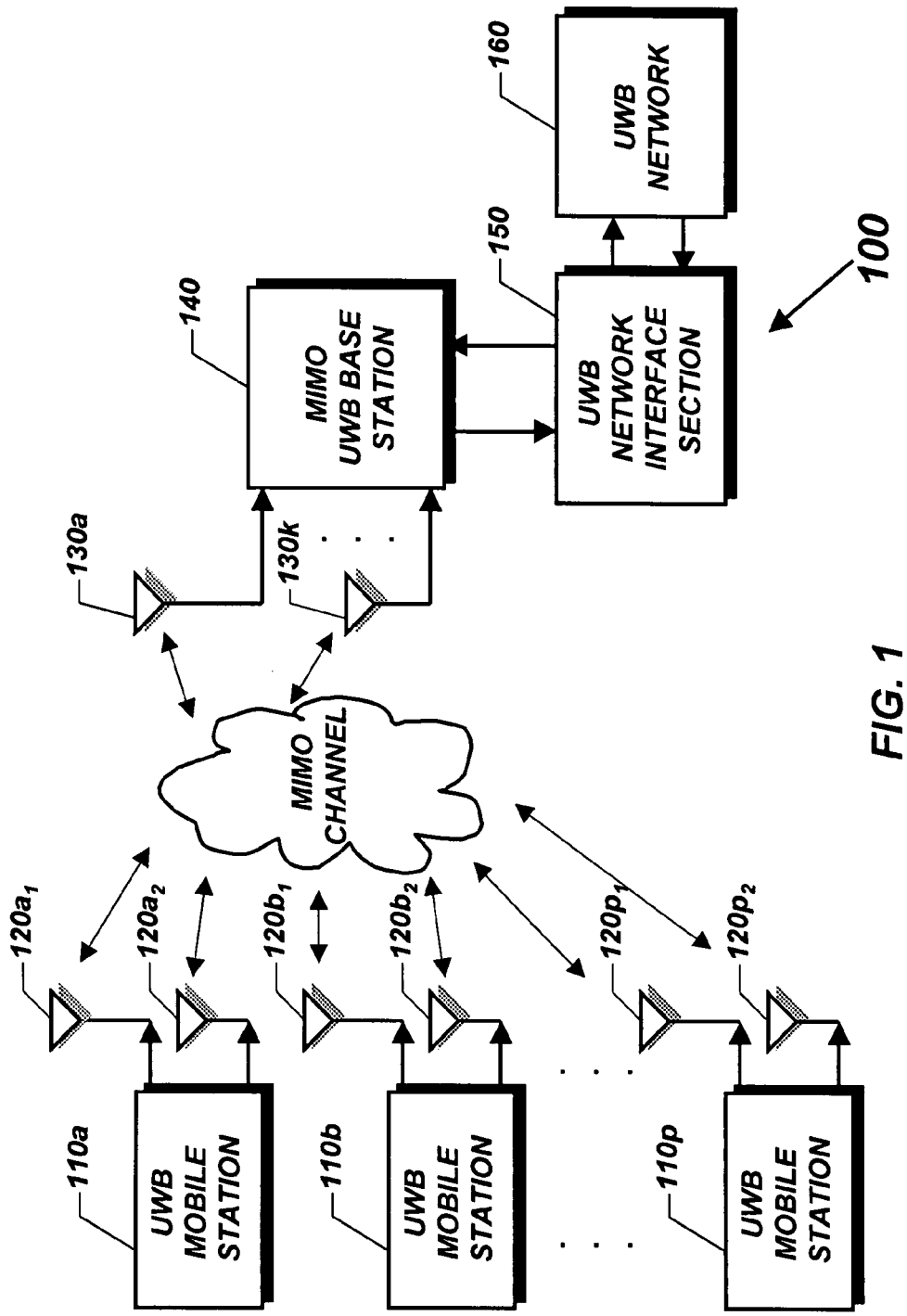
FIG. 1 is a block diagram of showing a MIMO-based multiuser OFDM multiband of the UWB communication transceiver system including different users of UWB mobile stations and a single UWB base station according to some embodiments.

A MIMO-based multiuser OFDM multiband of the UWB communication system 100 for the indoor UWB operation is illustrated in FIG. 1 in accordance with one embodiment of the present invention. UWB mobile stations from 110$a$ to 110$p$ can communicate with a MIMO UWB base station 140 to transmit and receive information data through MIMO-based frequency bands in an indoor environment simultaneously. The UWB mobile station 110$a$ transmits and receives the information data through its two antennas of 120$a_1$ and 120$a_2$ into air, and communicates with the MIMO UWB base station 140 through its eleven antennas from 130$a$ to 130$k$. In a similar way, other UWB mobile stations from 110$b$ to 110$p$ also transmit and receive the information data through their antennas from 120$b_1$ and 120$b_2$ to 120$p_1$ and 120$p_2$, respectively, and communicate with the MIMO UWB base station 140 through the antennas from 130$a$ to 130$k$ as well. The MIMO UWB base station 140 is coupled to an UWB network interface section 150, which is connected with an UWB network 160.

Each of the UWB mobile stations from 110a to 110p uses a unique PN sequence to spread and despread a user source signal. The MIMO UWB base station 140, knowing all of the PN sequences of the UWB mobile stations from 110a to 110p, can transmit and receive all of the information data from all of the UWB mobile stations from 110a to 110p based on a MIMO-based OFDM multiband solution by spreading and despreading of the user PN sequences. The MIMO-based OFDM multiband of the UWB communication system uses one of modulations, binary phase-shifted keying (BPSK), quadrature phase-shifted keying (QPSK) or 16-ary quadrature-amplitude modulation (16-QAM), and multicarrier within each of the frequency bands to transmit and receive the information data rate of 2.770 Gbps on one frequency band up to the information data rate of 11.082 Gbps on eleven frequency bands. As a result, the present invention of the MIMO-based multiuser OFDM multiband of the UWB communication system 100 can simultaneously transmit and/or receive the maximum data rate up to 11.082 Gbps by using all of the eleven frequency bands, with an enhancement of transmitting in a longer distance.

MIMO-Based UWB Base Station Transmitter Architecture

Figure 2:
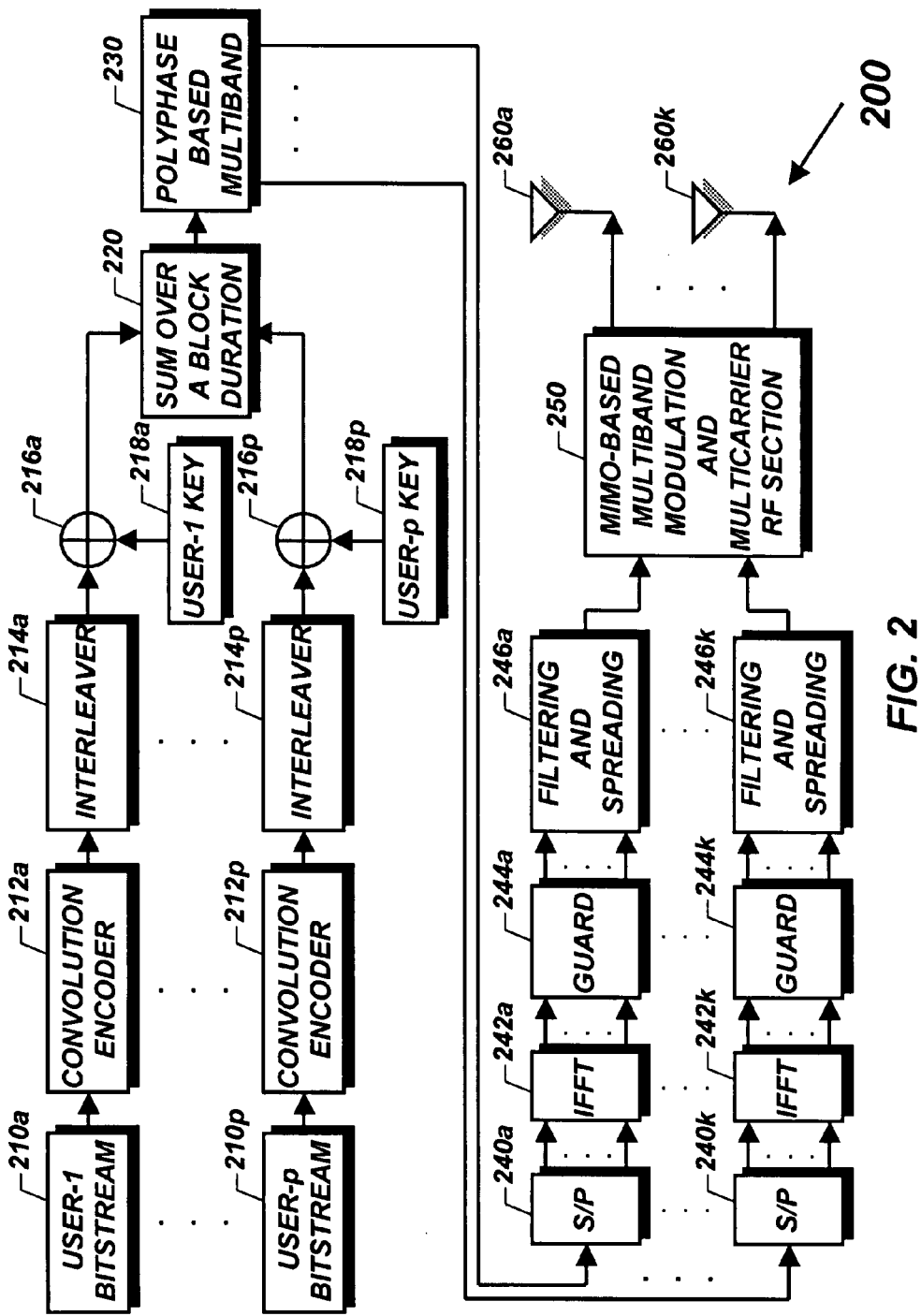
FIG. 2 is a block diagram of a MIMO-based multiuser OFDM multiband of an UWB base station communication transmitter employing eleven antennas according to some embodiments.

FIG. 2 is a block diagram of showing the MIMO-based multiuser OFDM multiband of UWB base station transmitter architecture 200 for the indoor UWB operation according to some embodiments. There are a number of p users from a user-1 bitstream 210a to a users bitstream 210p, respectively. The user-1 bitstream 210a is coupled to a ½-rate convolution encoder 212a, which is connected to an interleaver 214a. Using a unique PN sequence of a user-1 key 218a spreads the output sequence of the interleaver 214a. In a similar way, the user-p bitstream 210p is coupled to the ½-rate convolution encoder 212p that is connected to the interleaver 214p. Using the unique PN sequence of the user-p key 218p spreads the output sequences of the interleaver 214p. All of the PN sequences from the user-1 key 218a to the user-p key 218p are orthogonal each other. This means that a cross-correlation between one PN sequence and other PN sequences is almost zero, while a self-correlation of a user PN sequence is almost equal to one. Then, the p output sequences from the interleaver 214a to the interleaver 214p in a parallel operation are added together to form a serial sequence output by using a sum over block duration 220. The serial output of the sum over block duration 220 is converted into eleven parallel sequences by using a polyphase-based multiband 230. Thus, the first of the output sequence from the polyphase-based multiband 230 is converted into a 512-parallel sequence by using a serial-to-parallel (S/P) 240a. The 512-parallel sequence is formed to 512-parallel complex sequence with symmetric conjugate. The 512-parallel complex sequence is passed through an IFFT 242a to produce a 1024-parallel real sequence. The IFFT 242a is coupled to a guard 244a to insert 256 samples as a guard interval for the output sequence of the IFFT 242a. As a result, the output of the guard 244a is a 1280-parallel real sequence. Then, the 1280-parallel real sequences are passed through a filtering and spreading section 246a to produce even and odd modulated signal sequences. Carriers multiply the even and odd modulated signal sequence outputs of the filtering and spreading section 246a by using a MIMO-based multiband modulation and multicarrier RF section 250. In the same way, the eleventh of the output sequence from the polyphase-based multiband 230 is converted into a 512-parallel sequence by using an S/P 240k. The 512-parallel sequence is formed to 512-parallel complex sequence with symmetric conjugate. The 512-parallel complex sequence is passed through an IFFT 242k to produce a 1024-parallel real sequence. The IFFT 242k is coupled to a guard 244k to insert 256 samples as a guard interval for the output sequence of the IFFT 242k. Thus, the output of the guard 244k is a 1280-parallel real sequence. The guard interval is used to avoid intersymbol interference (ISI) between IFFT frames. Then, the 1280-parallel real sequences are passed through a filtering and spreading section 246k to produce even and odd modulated signal sequences. Carriers multiply the even and odd modulated signal sequences of the filtering and spreading section 246k by using the MIMO-based multiband modulation and RF multicarrier 250. Finally, the eleven output signals of the MIMO-based multiband modulation and RF multicarrier 250 are added together to form a new eleven signals in parallel, and passed through their power amplifiers and multiple antennas from 260a to 260k into air.

Figure 3:
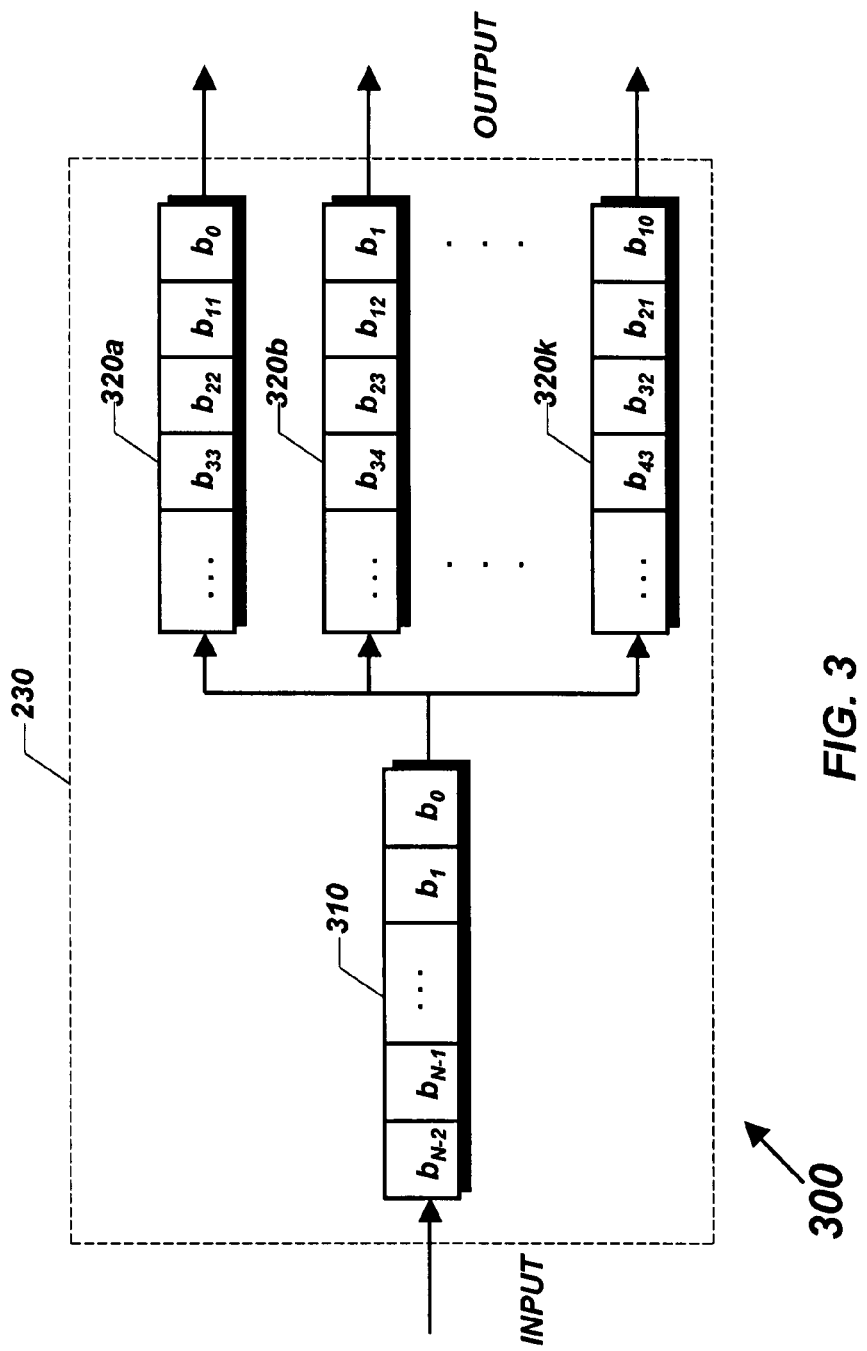
FIG. 3 is a detailed block diagram of a polyphase-based multiband according to some embodiments.

Referring to FIG. 3 is a detailed block diagram 300 of the polyphase-based multiband 230 according to some embodiments. The polyphase-base multiband 230 includes a random access memory (RAM) bank 310 storing a serial input data, and eleven RAM banks from 320a to 320k storing parallel data. The serial input sequence with a length of N data in the RAM bank 310 is divided into eleven parallel sequences with a length of N/11 data by mapping each data of the serial input sequences in the RAM bank 310 into eleven RAM banks from 320a to 320k. The number size of data in each of the RAM banks of 310 and 320a to 320k may be programmed depending on the block size as required by the MIMO UWB communication system.

Figure 4:
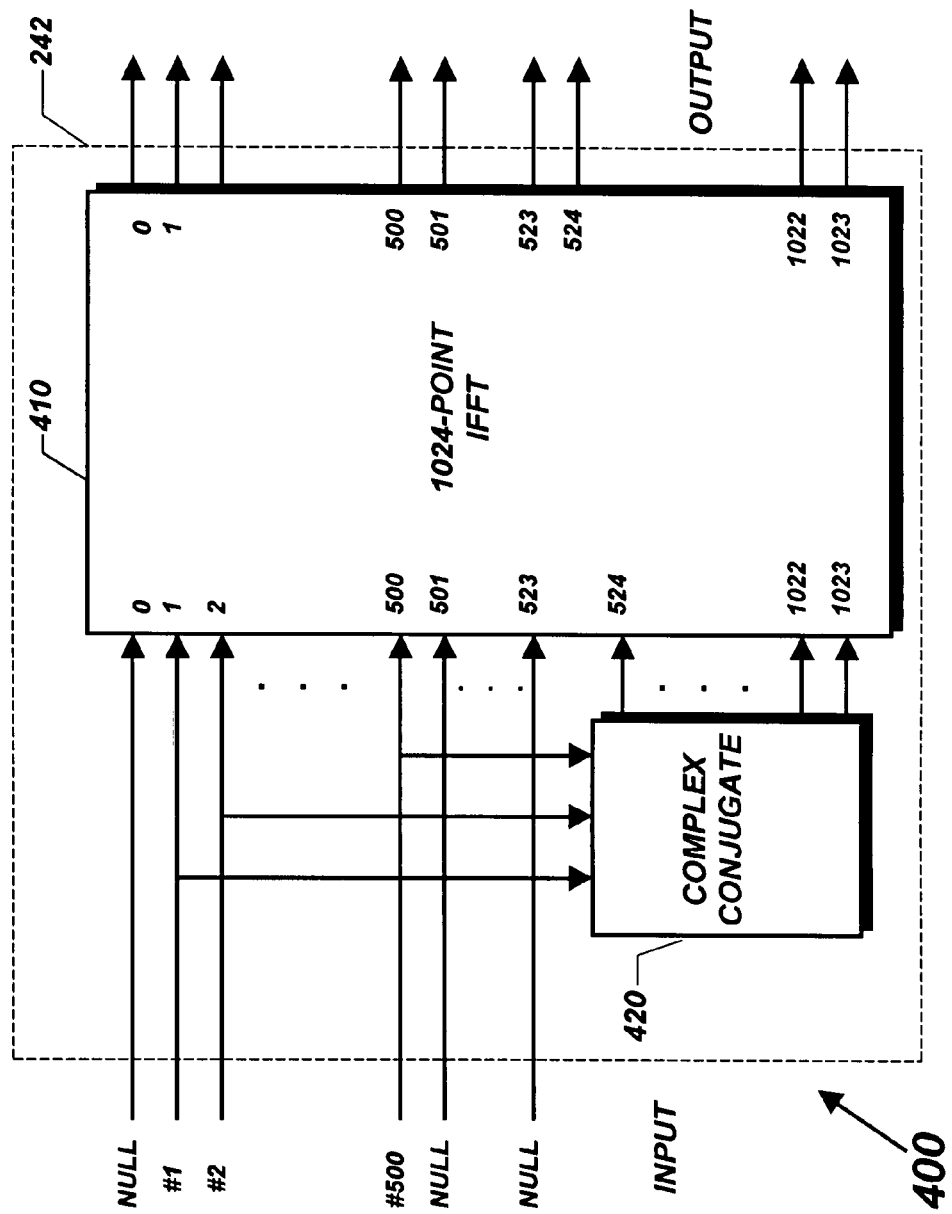
FIG. 4 is a detailed block of a 1024-point IFFT employing 1000 subcarriers and 24 NULLs according to some embodiments.

Referring to FIG. 4 is a detailed block diagram 400 of the 1024-point IFFT 410 according to some embodiments. There are 24 Nulls including #0 (DC), and #501 to #523. The values of the input #0 (DC) and #501 to #523 are set to zero. The coefficients from 1 to 500 are mapped to the same numbered IFFT inputs #1 to #500, while the coefficients from 500 to 1 are passed through a complex conjugate 420 and also copied into IFFT inputs from #524 to #1023 to form a complex sequence. Thus, there are a total of 1,000 subcarriers for transmitting data and pilot information. In order to make a coherent detection robust against frequency offsets and phase noise, eight of the 1,000 subcarriers are dedicated to pilot signals that are assigned into the subcarriers of #100, #200, #300, #400, and #624, #724, #824, and #924. These pilots are BPSK modulated by a pseudo binary sequence to prevent a generation of spectral lines. In this case, other 992 subcarriers of each OFDM are dedicated to assign for transmitting data information. After performing the IFFT operation, an output of the 1,024-point IFFT is cyclically extended to a desired length in each of the frequency bands.

Table 2 lists data rate-dependent parameters of the 1,024-point IFFT operation for each of the frequency bands:

TABLE 2

| Eleven band frequency data rate (Gbits/s) | One frequency band data rate (Mbits/s) | Modulation | Coding rate | Coded bits per sub-carrier | Coded bits per OFDM symbol | Data bits per OFDM symbol |
|---|---|---|---|---|---|---|
| 2.770 | 251.866 | BPSK | ½ | 1 | 991.999 | 495.999 |
| 5.541 | 503.732 | QPSK | ½ | 2 | 1983.998 | 991.999 |
| 11.082 | 1007.464 | 16-QAM | ½ | 4 | 3967.997 | 1983.998 |

Table 3 lists the 1,024-point IFFT of detailed timing-related parameters for each of the frequency bands:

TABLE 3

| Parameters | Descriptions | Value |
|---|---|---|
| $N_{ds}$ | Number of data subcarriers | 992 |
| $N_{ps}$ | Number of pilot subcarriers | 8 |
| $N_{ts}$ | Number of total subcarriers | 1000 |
| $D_{fs}$ | Frequency spacing for subcarrier (650 MHz/1024) | 0.6347 MHz |
| $T_{FFT}$ | IFFT/FFT period $(1/D_{fs})$ | 1.5755 µs |
| $T_{gd}$ | Guard duration $(T_{FFT}/4)$ | 0.3938 ρs |
| $T_{signal}$ | Duration of the signal BPSK-OFDM symbol $(T_{FFT} + T_{gd})$ | 1.9693 µs |
| $T_{sym}$ | Symbol interval $(T_{FFT} + T_{gd})$ | 1.9693 µs |
| $T_{short}$ | Short duration of training sequence $(10 \times T_{FFT}/4)$ | 3.938 µs |
| $T_{gd2}$ | Training symbol guard duration $(T_{FFT}/2)$ | 0.7877 µs |
| $T_{long}$ | Long duration of training sequence $(2 \times T_{FFT} + T_{gd2})$ | 3.938 µs |
| $T_{preamble}$ | Physical layer convergence procedure preamble duration $(T_{short} + T_{long})$ | 7.876 µs |

Figure 5:
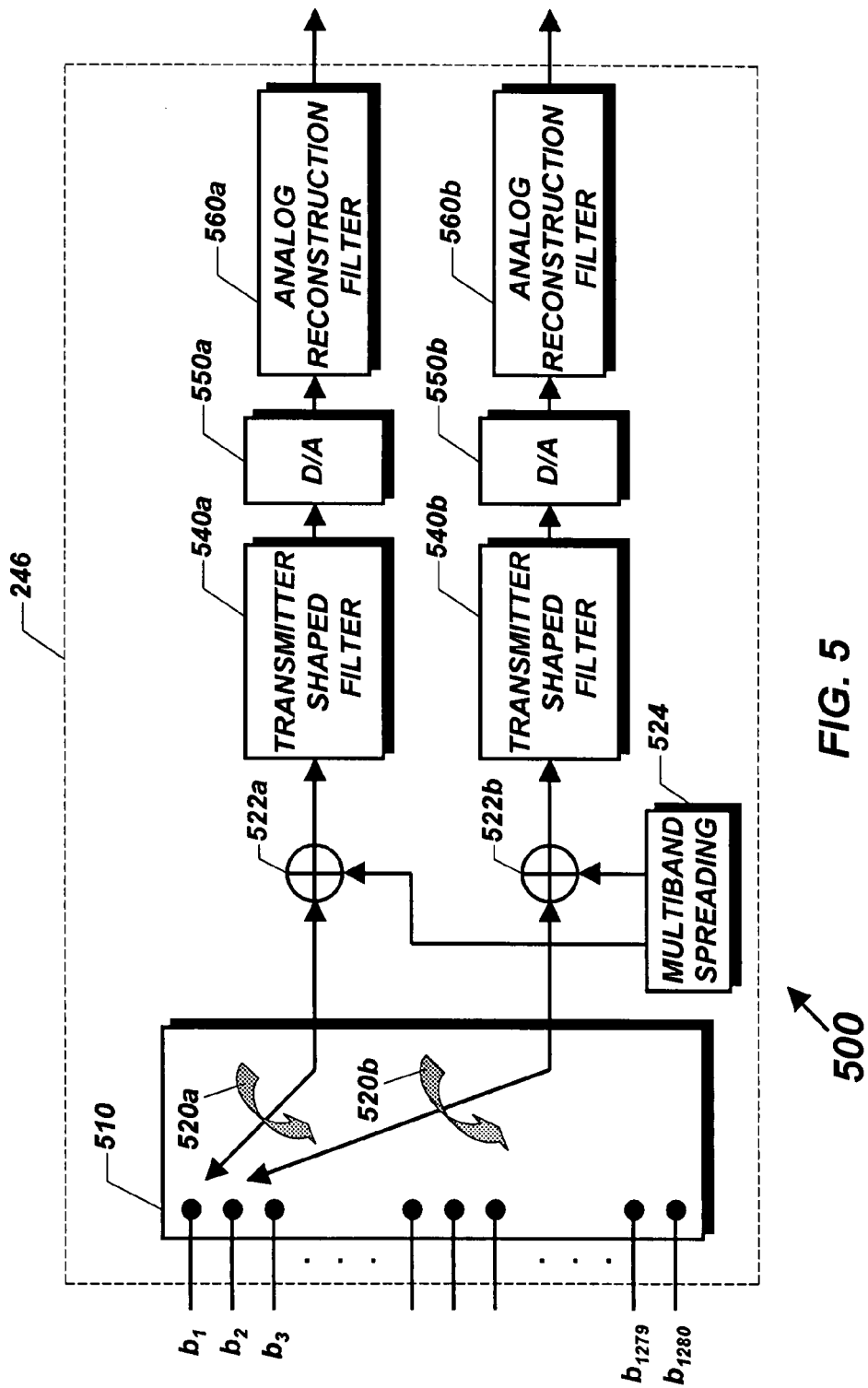
FIG. 5 is a detailed block diagram of a filtering and spreading section according to some embodiments.

FIG. 5 is a detailed block diagram 500 of the filtering and spreading section 246 according to some embodiments. A switch unit 510 including two switches of 520a and 520b is used to split a 1,280-parallel data sequences into two parallel data sequences with an even and an odd number, respectively. The switch 520a rotates to the even number of data (for example, $b_2$, $b_4$, $b_6$, ...) to form a serial even data sequence, and the switch 520b rotates to the odd number of data (for example, $b_1$, $b_3$, $b_5$, ...) to form a serial odd data sequence. The output sequences of the switches 520a and 520b are spread with a multiband spreading 524 by using two exclusive OR (XOR) of 522a and 522b, respectively. Using a transmitter shaped filter 540a to shape the transmitter spectrum and limit the frequency band filters the serial output sequence of the XOR 522a. The output of the transmitter shaped filter 540a is passed through a D/A converter 550a, which is coupled to an analog reconstruction-filter 560a. The analog reconstruction-filter 560a does a smooth of signal of the D/A converter 550a output. In the same way, using a transmitter shaped filter 540b to shape the transmitter spectrum and limit the frequency band filters the output of the serial output sequence of the XOR 522b. The output of the transmitter shaped filter 540b is passed through a D/A converter 550b that is coupled to an analog reconstruction-filter 560b. The analog reconstruction-filter 560b does smooth of the output signal of the D/A converter 550b.

Figure 6:
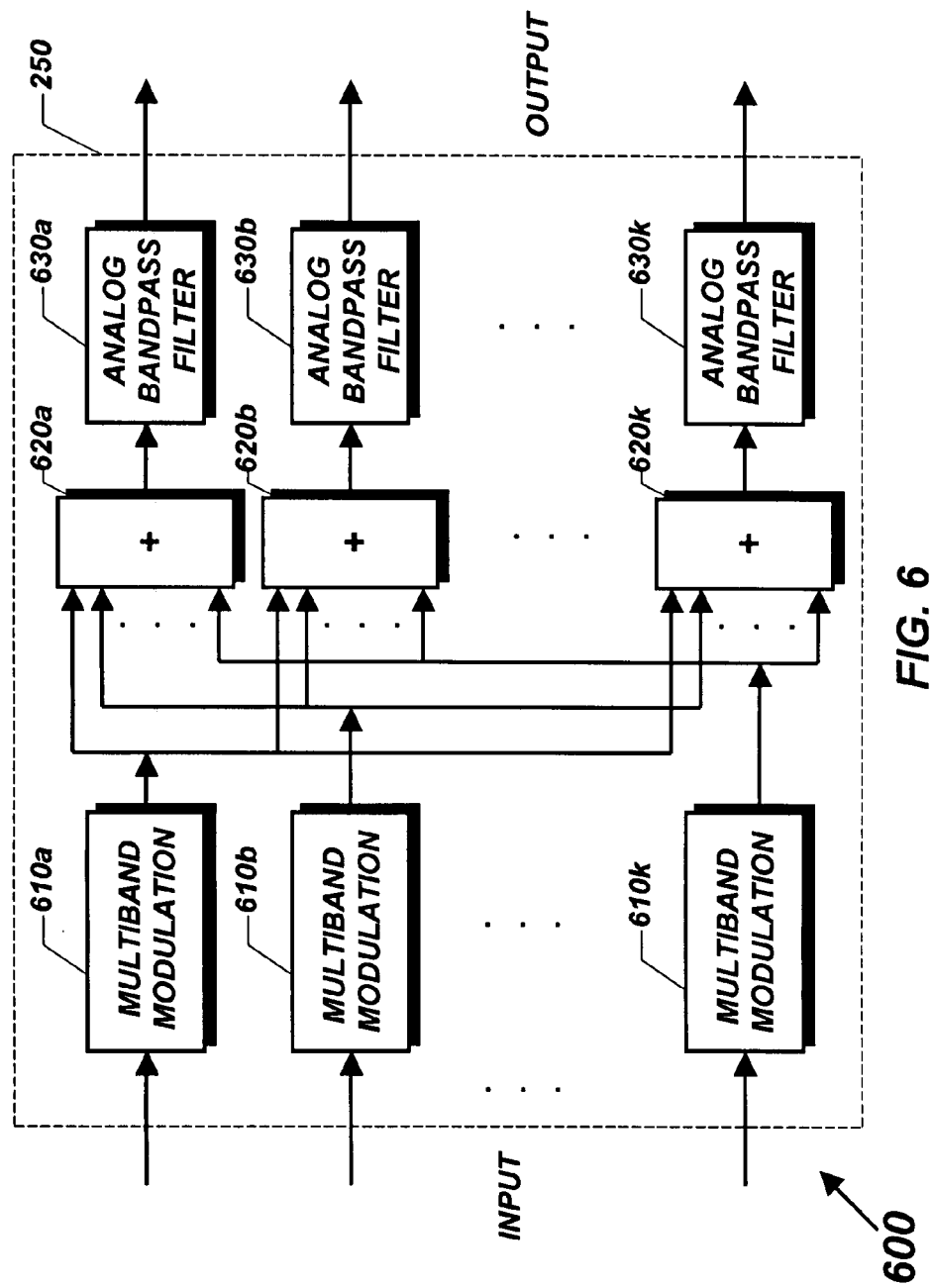
FIG. 6 is a detailed block diagram of a MIMO-based multiband modulation and multicarrier RF section according to some embodiments.

Referring to FIG. 6 is a detailed block diagram 600 of the MIMO-based multiband modulation and multicarrier RF section 250 according to some embodiments. Analog output signals of the filtering and spreading from 246a to 246k as shown in FIG. 2 in parallel are passed through eleven multiband modulations from 610a to 610k. All of the multiband modulations from 610a to 610k are equivalent. The multiband modulations from 610a to 610k may be one of modulations including BPSK, QPSK, or 16-QAM. The output signals of the multiband modulations from 610a to 610k are coherently added together by using eleven sum units from 620a to 620k. Then, the outputs of eleven sum units from 620a to 620k are in parallel passed through eleven analog bandpass filters from 630a to 630k to produce bandlimited signals for multiple antennas transmitter.

Spectrums of MIMO-Based UWB Base Station Transmitter

Figure 7:
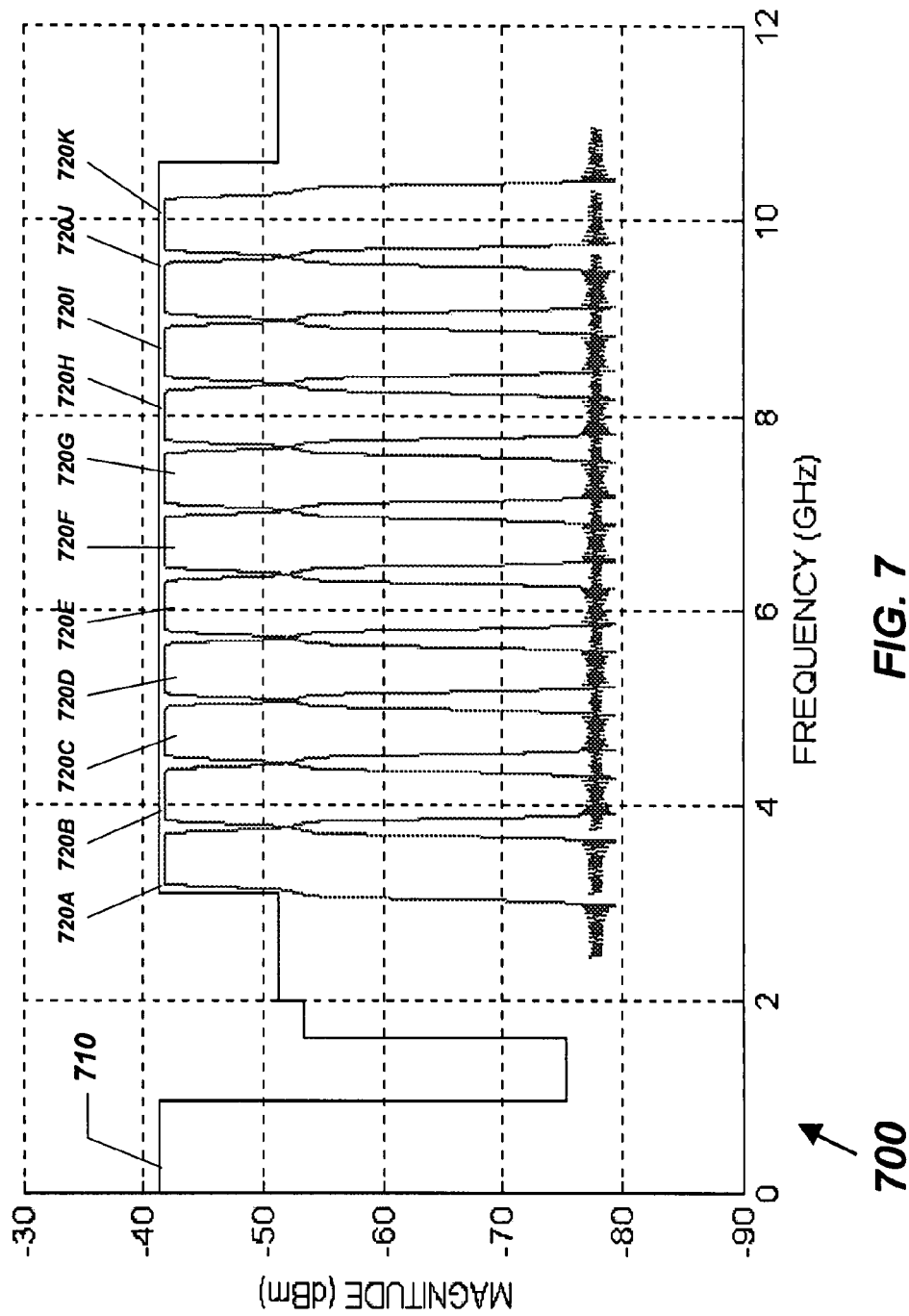
FIG. 7 is a frequency spectrum output of the MIMO-based multiuser OFDM multiband of the UWB base station communication transmitter for the indoor UWB operation according to one embodiment.

FIG. 7 is an output frequency spectrum 700 of the MIMO-based multiuser OFDM multiband of the UWB base station communication transmitter, including eleven frequency band spectrums from 720A to 720K according to some embodiments. A FCC emission limitation 710 for the indoor UWB operation is also shown in FIG. 7. Each transmitter frequency bandwidth of the eleven frequency band spectrums from 720A to 720K is 650 MHz and is fitted under the indoor FCC emission limitation 710 with different carrier frequencies. The detail positions of each transmitter frequency band spectrums (dBm) along with the center, lower and upper frequencies (GHz) as well as the channel frequency bandwidth (MHz) are listed in Table 4:

TABLE 4

| Multichannel Label | Center Frequency (GHz) | Lower Frequency (GHz) | Upper Frequency (GHz) | Frequency Bandwidth (MHz) |
|---|---|---|---|---|
| 720A | 3.45 | 3.125 | 3.775 | 650 |
| 720B | 4.10 | 3.775 | 4.425 | 650 |
| 720C | 4.75 | 4.425 | 5.075 | 650 |
| 720D | 5.40 | 5.075 | 5.725 | 650 |
| 720E | 6.05 | 5.725 | 6.375 | 650 |
| 720F | 6.70 | 6.375 | 7.025 | 650 |
| 720G | 7.35 | 7.025 | 7.675 | 650 |
| 720H | 8.00 | 7.675 | 8.325 | 650 |
| 720I | 8.65 | 8.325 | 8.975 | 650 |
| 720J | 9.30 | 8.975 | 9.625 | 650 |
| 720K | 9.95 | 9.625 | 10.275 | 650 |

During the indoor UWB operation, the fourth and/or fifth frequency bands of the MIMO-based multiuser OFDM multiband of the UWB base station transmitters can be turned off in order to avoid interference with the WLAN 802.11a lower U-NII frequency band and/or upper U-NII frequency band. In some cases, the MIMO multiuser OFDM multiband of the UWB base station and mobile transmitters can turn off some subcarriers within the OFDM in the fourth and/or fifth multi-frequency bands if the WLAN 802.11a only uses certain subchannels in the lower U-NII or in the upper U-NII frequency bands.

MIMO-Based UWB Mobile Receiver Architecture

Figure 8:
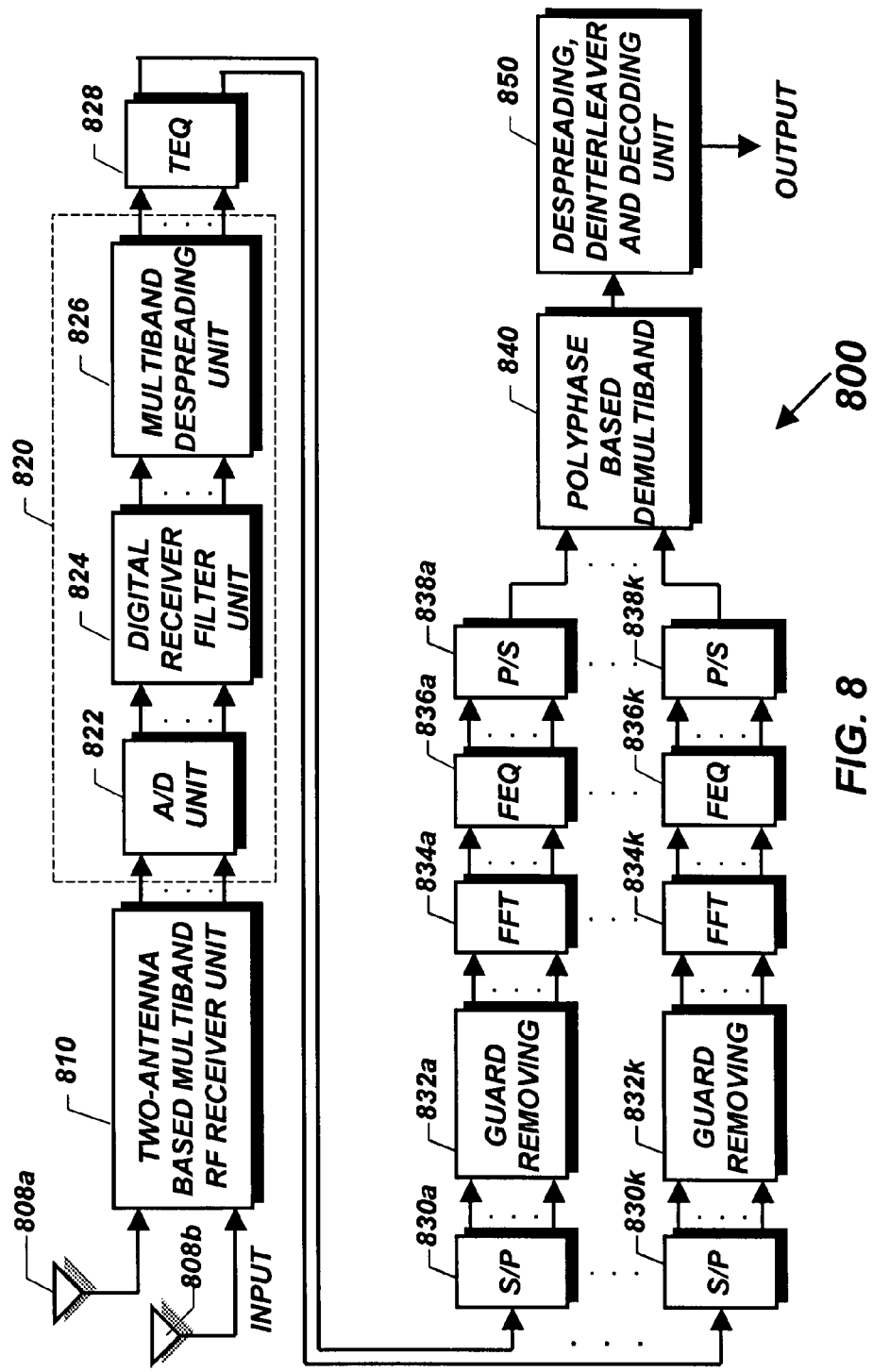
FIG. 8 is a block diagram of a MIMO-based OFDM multiband of an UWB mobile communication receiver for a single user according to some embodiments.

FIG. 8 is a block diagram of a MIMO-based OFDM multiband of UWB mobile communication receiver 800 for the indoor UWB operation according to some embodiments. A two-antenna based multiband RF receiver unit 810, which is coupled to an A/D unit 822, receives the MIMO-based multiuser OFDM multiband of UWB signals from two antennas 808a and 808b. The eleven bandlimited MIMO-based multiuser OFDM multiband of UWB analog signal outputs of the two-antenna based multiband RF receiver unit 810 are in parallel sampled and quantized by using an A/D converter unit 822, with the sampling rate at 720 MHz. Using a digital receiver filter unit 824 to remove out of band signals filters the digital signals of output of the A/D converter unit 822. Then the outputs of digital receiver filter unit 824 despread with a despreading sequence of a multiband-despreading unit 826. The output digital signals of the multiband-despreading unit 826 are passed through time-domain equalizers (TEQ) 828. The TEQ 828 is used to reduce the length of cyclic prefix to a more manageable number without reducing performance significantly. In other words, the TEQ 828 can produce a new target channel with a much smaller effective constraint length when concatenated with the channel. Thus, the outputs of the TEQ 828 in parallel are passed through a set of S/Ps from 830a to 830k to produce parallel digital sequences. Each of the S/Ps from 830a to 830k produces 1280 parallel digital sequences for each of guard removing units from 832a to 832k. The guard removing units from 832a to 832k remove 256 samples from the 1280 parallel digital sequences of the S/Ps from 830a to 830k to produce 1024 parallel digital sequences, which are used as inputs for FFT units from 834a to 834k. Each of the FFT units from 834a to 834k produces 512 frequency-domain signals that are used for frequency-domain equalizer (FEQ) units from 836a to 836k. The FEQ units from 836a to 836k are used to compensate for phase distortions, which are a result of phase offsets between the sampling clocks in the transmitter and the receiver of the MIMO-based multiuser OFDM multiband of the UWB communication transceiver. This is because the phases of the received outputs of the multiband FFT units from 834a to 834k are unlikely to be exactly the same as the phases of the transmitter symbols at the input to the IFFT units from 242a to 242k of the MIMO-based multiuser OFDM multiband of UWB base station transmitter as shown in FIG. 2. Thus, the outputs of the FEQ units from 836a to 836k are passed through a set of P/S units from 838a to 838k to produce a serial sequence for all of the eleven frequency bands. All of the serial sequences from the parallel-to-serial (P/S) units from 838a to 838k, with each sequence length of N, are added together to produce a sequence length of 11N by using a polyphase-based demultiband 840. The output sequence of the polyphase-based demultiband 840 is passed through a despreading, deinterleaver, and decoding unit 850. The despreading, deinterleaver, and decoding unit 850 perform despreading, deinterleaving and decoding for the MIMO-based multiuser OFDM multiband of the UWB mobile communication receiver.

Figure 9:
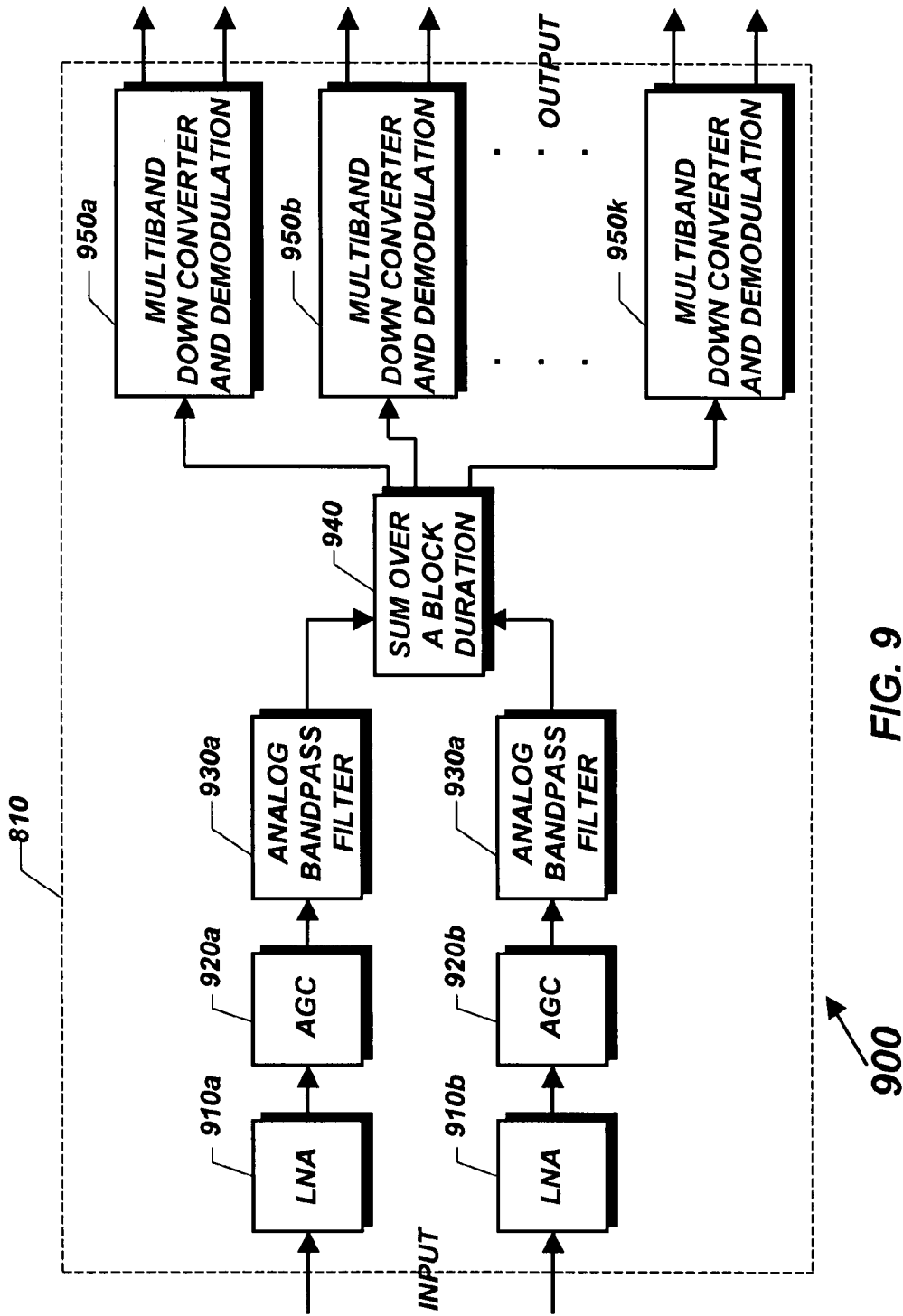
FIG. 9 is a detailed block diagram of a two-antenna multiband RF receiver unit according to some embodiments.

Referring to FIG. 9 is a detailed block diagram 900 of the two-antenna based multiband RF section receiver section 810 according to some embodiments. The outputs of the two-antenna 808a and 808b in FIG. 8 are in parallel passed into two low noise amplifiers (LNA) from 910a and 910b, which are coupled to two automatic gain controls (AGC) of 920a and 920b. The outputs of the AGCs 920a and 920b are passed through two analog bandpass filters of 930a and 930b to produce two output signals that are added together by using a sum over block duration 940. Then, an output signal of the sum over block duration 940 is in parallel passed into eleven-multiband down converters and demodulations from 950a to 950k. Each of the multiband down converters and demodulations from 950a to 950k produces two output signals.

Figure 10:
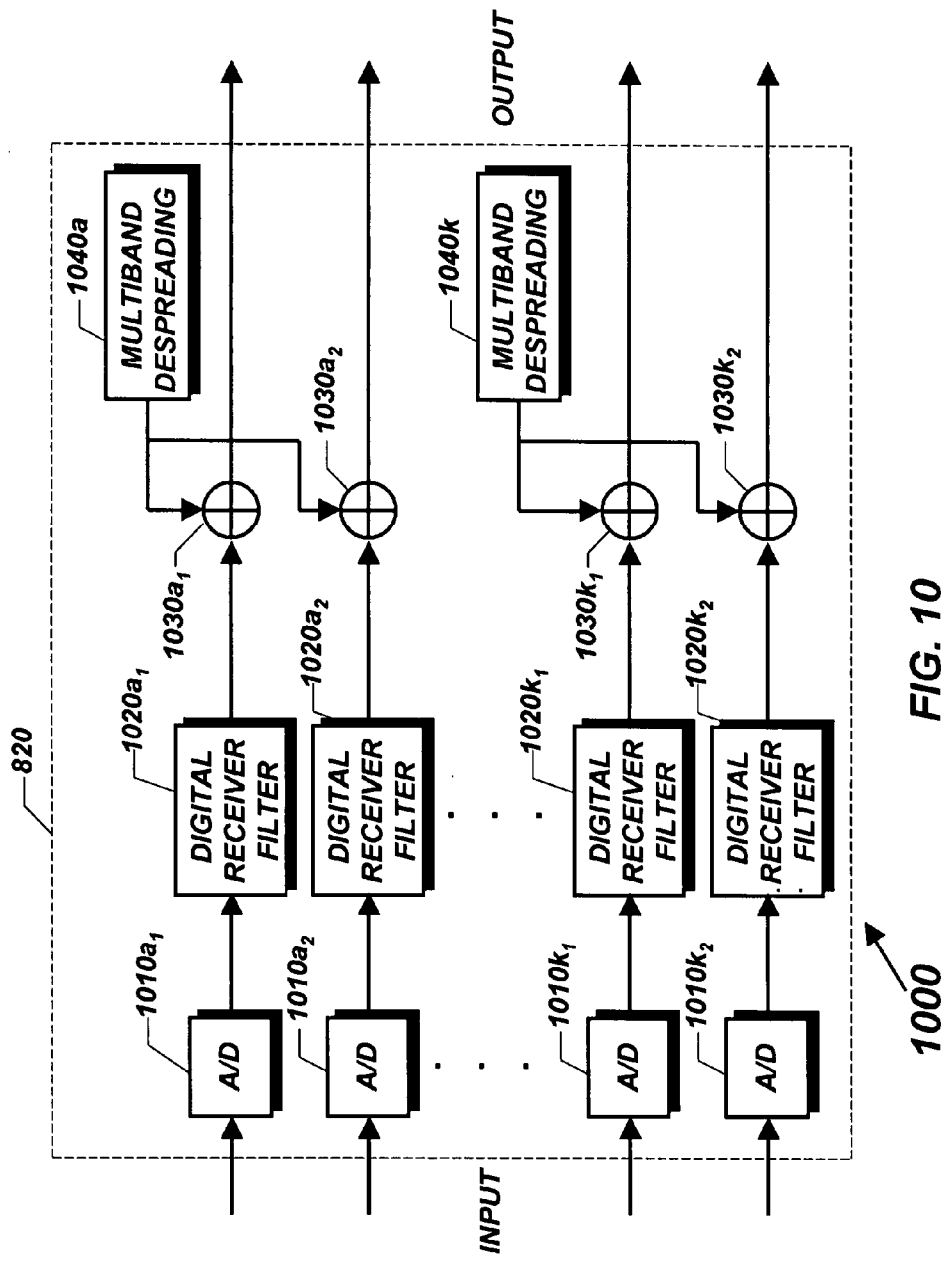
FIG. 10 is a detailed block diagram of a combination subsection including a set of A/D converters, a set of digital receiver filters, and a set of multiband spreading.

Referring to FIG. 10 is a detailed block diagram 1000 of one combination section 820 according to some embodiments. This combination section 820 includes twenty-two A/D converters from $1010a_1$ and $1010a_2$ to $1010k_1$ and $1010k_2$, twenty-two digital receiver filters from $1020a_1$ and $1020a_2$ to $1020k_1$ and $1020k_2$, and twenty-two XOR from $1030a_1$ and $1030a_2$ to $1030k_1$ and $1030k_2$, and eleven multiband despreading from 1040a to 1040k. The outputs of the multiband down converters and demodulations from 950a to 950k in FIG. 9 are in parallel passed through the twenty-two A/D converters from $1010a_1$ and $1010a_2$ to $1010k_1$ and $1010k_2$ to produce the quantized digital signals. All of the A/D converters from $1010a_1$ and $1010a_2$ to $1010k_1$ and $1010k_2$ use the same bit resolution and the same sampling rate. The A/D converters from $1010a_1$ and $1010a_2$ to $1010k_1$ and $1010k_2$ are coupled to the twenty-two digital receiver filters from $1020a_1$ and $1020a_2$ to $1020k_1$ and $1020k_2$, respectively. All of the twenty-two digital receiver filters from $1020a_1$ and $1020a_2$ to $1020k_1$ and $1020k_2$ filter out of unwanted digital signals from the outputs of the twenty-two A/D converters from $1010a_1$ and $1010a_2$ to $1010k_1$ and $1010k_2$, respectively. All of the twenty-two digital receiver filters from $1020a_1$ and $1020a_2$ to $1020k_1$ and $1020k_2$ are equivalent, which contain the same filter attenuations and the filter bandwidths with the same filter coefficients and a linear phase. The outputs of the twenty-two digital receiver filters from $1020a_1$ and $1020a_2$ to $1020k_1$ and $1020k_2$ are despread with the output sequences of the eleven multiband despreading from 1040a to 1040k, respectively, by using the twenty-two XOR from $1030a_1$ and $1030a_2$ to $1030k_1$ and $1030k_2$, respectively. All of the output sequences of the eleven multiband despreading from 1040a to 1040k are orthogonal each other.

Figure 11:
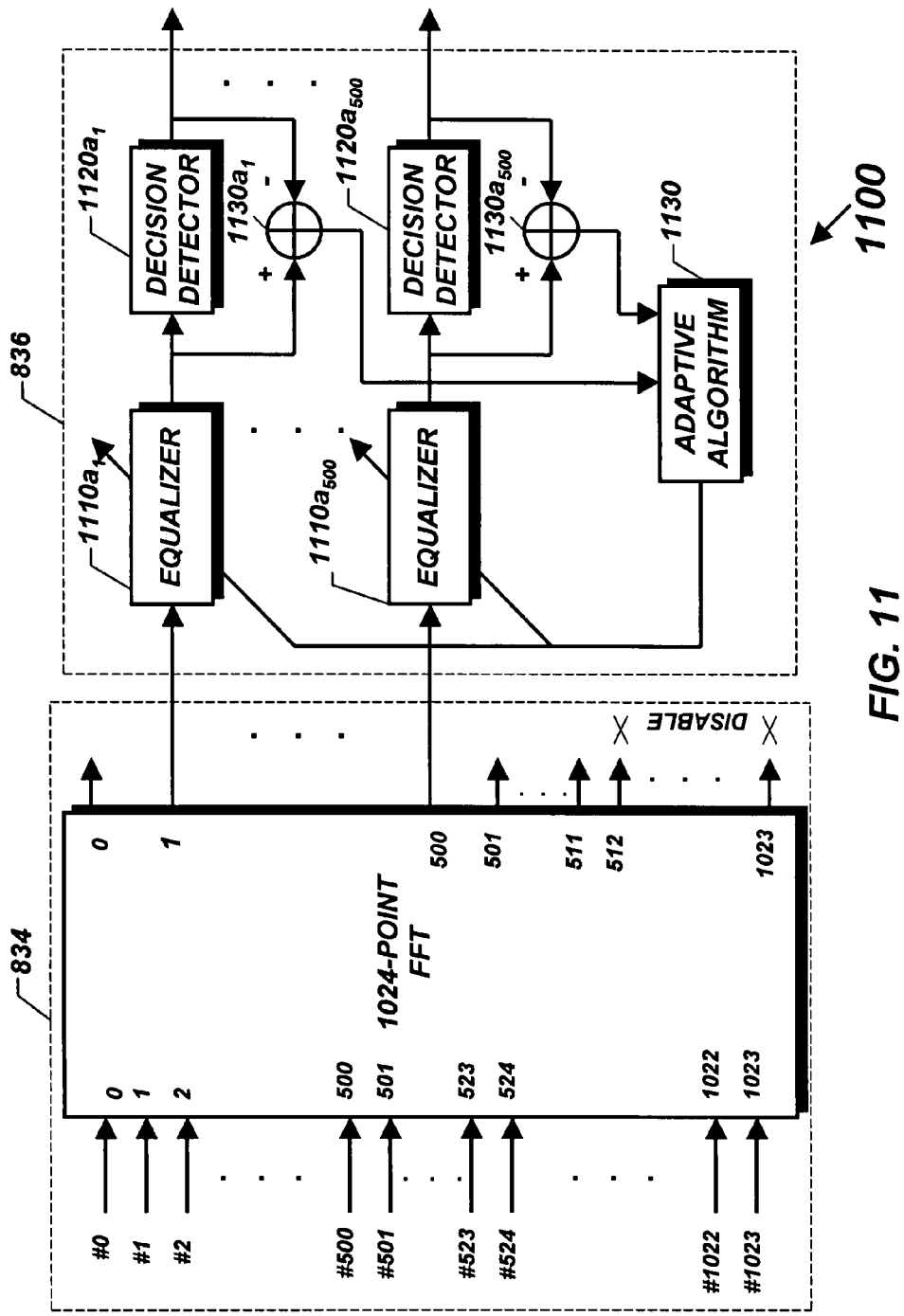
FIG. 11 is a detailed block diagram of a combination subsection including a fast Fourier transform (FFT) and frequency-domain equalizers (FEQ) according to some embodiments.

FIG. 11 is a detailed block diagram 1100 of a combination subsection including the FFT 834 and the FEQ 836 according some embodiments. The FFT 834 has a 1024-point input of real-value and produces a 512-point complex data with labels from 0 to 511, while a 512-point complex data with labels from 511 to 1023 is disable. The FFT 834 with labels from 0 to 511 also contains 12 Nulls. So, the FFT 834 produces a 500-point complex data for the FEQ 836. The FEQ 836 contains 500 equalizers from $1110a_1$ to $1110a_{500}$, 500 decision detectors from $1120a_1$ to $1120a_{500}$, and 500 subtractions from $1130a_1$ to $1130a_{500}$ that operate in parallel. Each of the equalizers from $1110a_1$ to $1110a_{500}$ has N-tap with adaptive capability. Each of the decision detectors from $1120a_1$ to $1120a_{500}$ is a multi-level threshold decision. Each of the subtractions from $1130a_1$ to $1130a_{500}$ performs subtracting between the output of each of the equalizers from $1110a_1$ to $1110a_{500}$ and the output of each of the decision detectors from $1120a_1$ to $1120a_{500}$. The output of each of the subtraction from $1130a_1$ to $1130a_{500}$ is referred to as an error signal, which is used to adjust the N-tap coefficients of the each of the equalizers from $1110a_1$ to $1110a_{500}$ by using an adaptive algorithm 1130.

The phases of the received outputs of the FFT 834 do not have exactly the same as the phases of the transmitter symbols at the input to the IFFT units from 242a to 242k of the MIMO-based multiuser OFDM multiband of UWB base station transmitter as shown in FIG. 2. In addition, the phase responses have to consider the channel, which is coped with the TEQ 828 as shown in FIG. 8. Thus, the FEQ 836 in FIG. 11 is used to compensate for the phase distortion that is a result of a phase offset between the sampling clocks in the transmitter and the receiver of the MIMO-based multiuser OFDM multiband of the UWB communication transceiver. The FEQ 836 also offers the additional benefit of received signal scaling before decoding since the FEQ 836 can be used to adjust the gain of the FFT 834 output so that the decision detectors from $1120a_1$ to $1120a_{500}$ can be set the same parameters for all subchannels regardless of the different subchannel attenuations.

Figure 12:
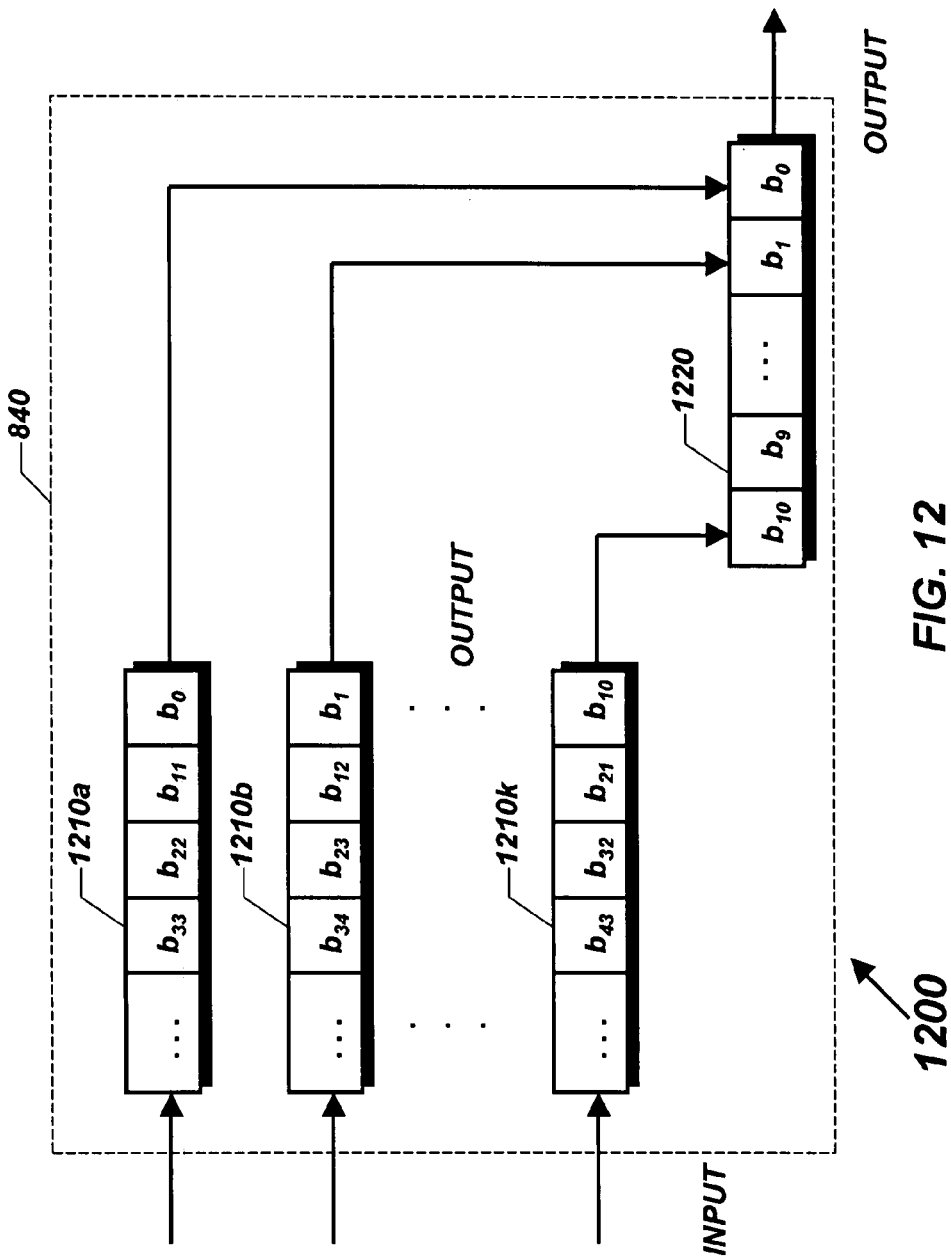
FIG. 12 is a detailed block diagram of a polyphase-based demultiband according to some embodiments.

FIG. 12 is a detailed block diagram 1200 of a polyphase-based demultiband 840 according to some embodiments. The polyphase-base demultiband 840 includes eleven RAM banks from 1210$a$ to 1210$k$ storing parallel data, and one RAM bank of 1220 storing a serial data. The size of RAM banks from 1210$a$ to 1210$k$ and 1220 can be programmed. At a time unit, one of bit data from all of the eleven RAM banks from 1210$a$ to 1210$k$ is in parallel shifted into the RAM bank of 1220. The RAM bank of 1220 then shifts out all the bit data. The above procedure is repeated until finishing all the bit data in the RAM banks from 1210$a$ to 1210$k$.

Figure 13:
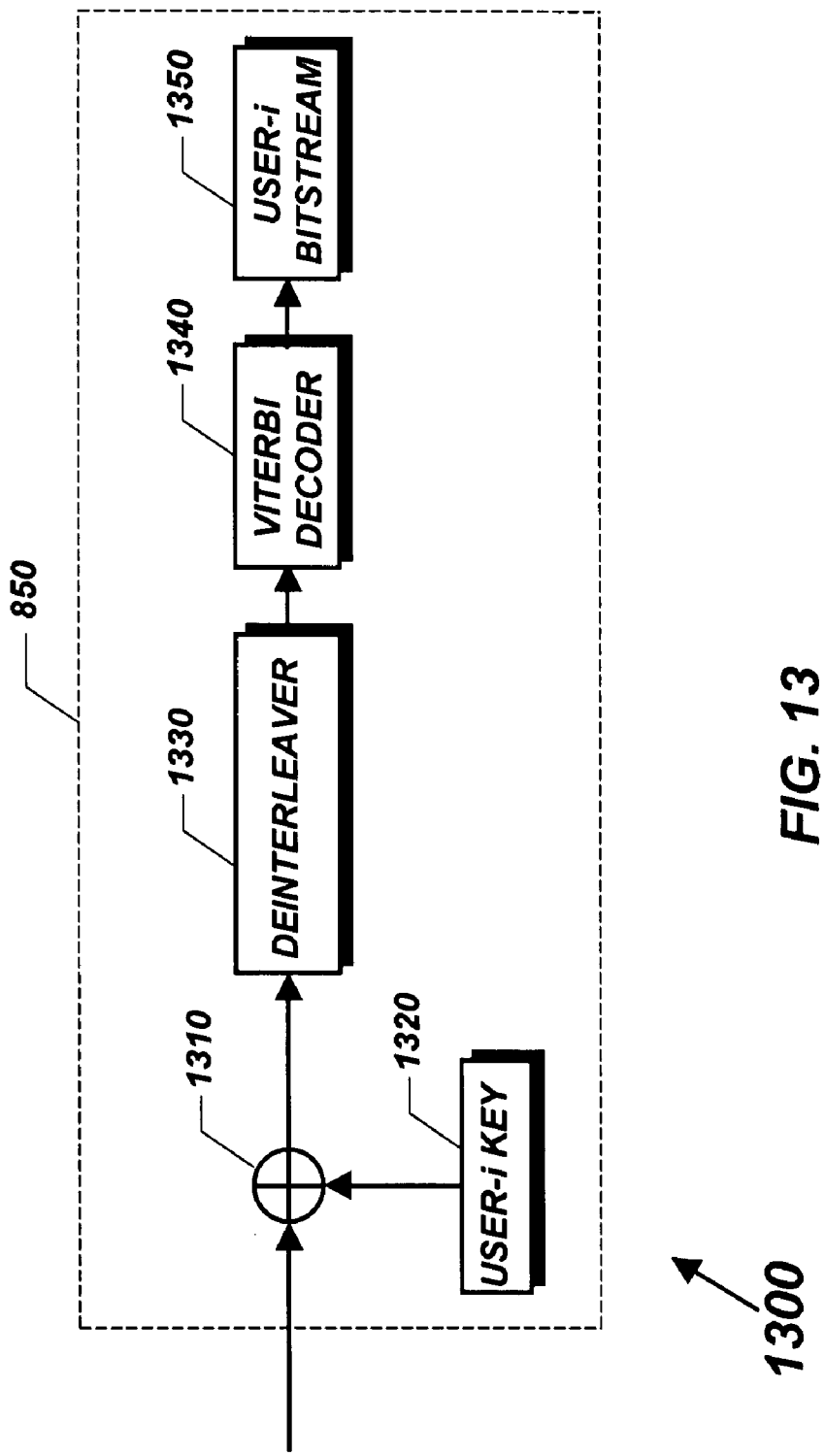
FIG. 13 is a detailed block diagram of a despreading, deinterleaver, and decoding unit for a single user of the UWB mobile communication receiver according to some embodiments.

Referring to FIG. 13 is a detailed block diagram 1300 of the despreading, deinterleaver, and decoding unit 850 according to some embodiments. This unit 850 includes a despreading 1310, a user-i key 1320, a deinterleaver 1330, a Viterbi decoding 1340, and a user-i bitstream 1350. The output sequence of the polyphase-based demultiband 840 in FIG. 8 is despread with a spreading sequence of the user-i key 1320, which provides a unique key sequence, by using the despreading 1310. The despreading 1310 is a XOR operation to produce an encoded user-i data bitstream. This encoded user-i data bitstream is then deinterleaved by using the deinterleaver 1330 that is also coupled to the Viterbi decoding 1340. The Viterbi decoding 1340 decodes the encoded user-i data bitstream to produce an original transmitted user-i data bitstream that is stored into the user-i bitstream 1350.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A multiple-input multiple-output (MIMO)-based multiuser orthogonal frequency division multiplex (OFDM) multiband of ultra wideband (UWB) base station communication transmitter comprising:

p user bitstream coupled to p convolution encoders, where p is an integer and greater than 1;

said p convolution encoders coupled to p interleavers;

p outputs of said p interleavers spread out by p user keys to form an encoded sequence by a sum over a block;

each of said p user keys is a unique and orthogonal each other;

said sum over a block coupled to a polyphase-based multiband; wherein said polyphase-based multiband includes a random access memory (RAM) bank with a length size of N for storing serial input data and P RAM banks with a length size of N/P for storing parallel output data, where N, and P are integers and greater than 1, N is greater than P, and N/P is an integer;

said polyphase-based multiband coupled to k serial-to-parallel (S/P), where k is an integer and greater than 1;

said k S/P coupled to k inverse fast Fourier transforms (IFFTs);

said k IFFTs coupled to k guards;

said k guards coupled to k filtering and spreading units;

said k filtering and spreading units coupled to a MIMO-based multiband and multicarrier radio frequency (RF) unit; and said MIMO-based multiband and multicarrier RF unit coupled to k antennas.

2. The MIMO-based multiuser OFDM multiband of UWB base station communication transmitter of claim 1 wherein polyphase-based multiband can produce P parallel data sequences with a data rate of N/P from a serial data sequence with a data rate of N, where N, and P are integers and greater than 1, N is greater than P, and N/P is an integer.

3. The MIMO-based multiuser OFDM multiband of UWB base station communication transmitter of claim 1 wherein each of said k filtering and spreading units further comprises:

a dual-switch with N inputs and two outputs, where N is an integer and greater than 1;

said two outputs of the dual-switch spread out by a multiband spreading via two exclusive-OR (XOR) modules;

said two XOR modules coupled to two transmitter shaped filters followed by two digital-to-analog (D/A) converters; and said two D/A converters coupled to two analog reconstruction filters.

4. The MIMO-based multiuser OFDM multiband of UWB base station communication transmitter of claim 3 wherein said multiband spreading produces an orthogonal sequence for each of frequency bands.

5. The MIMO-based multiuser OFDM multiband of UWB base station communication transmitter of claim 4 wherein signals of frequency bands are orthogonal each other.

6. The MIMO-based multiuser OFDM multiband of UWB base station communication transmitter of claim 1 wherein said MIMO-based multiband modulation and multicarrier RF unit further includes k multiband modulations, k additions followed by k analog bandpass filters, and each of the k multiband modulations coupled to all of the k additions, where k is an integer and greater than 1.

7. The MIMO-based multiuser OFDM multiband of UWB base station communication transmitter of claim 6 wherein the k multiband modulations equivalently contain one of the modulations including binary phase-shifted keying (BPSK), quadrature phase-shifted keying (QPSK) or 16-ary quadrature-amplitude-modulation (16-QAM).

8. The MIMO-based multiuser OFDM multiband of UWB base station communication transmitter of claim 1 wherein said MIMO-based multiband and multicarrier RF unit coupled to said k antennas is used to enhance UWB signals quality and\or increase UWB transmitting distance.

9. The MIMO-based multiuser OFDM multiband of UWB base station communication transmitter of claim 3 wherein each of said multiband spreading has two outputs producing two exact sequences.

10. A multiple-input multiple-output (MIMO)-based multiuser orthogonal frequency division multiplex (OFDM) multiband of ultra wideband (UWB) mobile communication receiver comprising:

two antennas;
a two-antenna based multiband radio frequency (RF) receiver unit;
said two-antenna based multiband RF receiver unit coupled to a combination section including an analog-to-digital (A/D) unit, a digital receiver filter unit, and a multiband-despreading unit;
said A/D unit further including 2k A/D converters with the same sampling rate and resolution, where k is an integer and greater than 1;
said digital receiver filter unit further having 2k digital receiver filters;
said 2k A/D converters coupled to 2k digital receiver filters;
said multiband-despreading unit further comprising k multiband spreading;
each of said k multiband spreading spreads out two outputs of the said digital receiver filters via two exclusive-OR (XOR) modules;
said combination section coupled to a time-domain equalizer (TEQ) unit, which is M inputs and outputs where M is an integer and greater than 1;
said TEQ unit coupled to k serial-to-parallel (S/P) followed by k guard removings that are connected to k fast Fourier transforms (FFTs);
each of said k FFTs having 2N inputs, N outputs, N disable-point, where N is an integer and greater than 1;
said k FFTs coupled to k frequency-domain equalizer (FEQ) units that are connected with k parallel-to-serial (P/S);
each of said FEQ units further including Q equalizers, Q decision detectors, Q subtractors, and an adaptive algorithm, where Q is an integer and greater than 1;
said k P/S coupled to a polyphase-based demultiband; and
said polyphase-based demultiband coupled to a despreading, deinterleaver, and decoding unit.

11. The MIMO-based multiuser OFDM multiband of UWB mobile communication receiver of claim 10 wherein said 2k digital receiver filters have the same magnitude response and linear phase with the same number of filter coefficients, where k is an integer and greater than 1.

12. The MIMO-based multiuser OFDM multiband of UWB mobile communication receiver of claim 10 wherein said two-antenna based multiband RF receiver unit further includes two low-noise amplifier (LNA), two automatic gain control (AGC), two analog bandpass filters, an addition, eleven multiband down converters and demodulations.

13. The MIMO-based multiuser OFDM multiband of UWB mobile communication receiver of claim 10 wherein said k multiband despreading generate k unique but different orthogonal despreading sequences for each of the frequency bands, where k is an integer and greater than 1.

14. The MIMO-based multiuser OFDM multiband of UWB mobile communication receiver of claim 10 wherein said polyphase-based demultiband further includes a random access memory (RAM) bank with a length size of N, and P parallel RAM banks with a length size of N/P, where N and P are integers and greater than 1 and N/P is an integer.

15. The MIMO-based multiuser OFDM multiband of UWB mobile communication receiver of claim 14 wherein said polyphase-based demultiband produces a serial output sequence with a data rate of N from P parallel input sequences with a data rate of N/P, where N and P are integers and greater than 1 and N/P is an integer.

16. A multiple-input multiple-output (MIMO)-based multiuser orthogonal frequency division multiplex (OFDM) multiband of ultra wideband (UWB) communication system comprising:
a MIMO-based multiuser OFDM multiband of UWB base station communication transmitter and receiver;
said MIMO-based multiuser OFDM multiband of UWB base station communication transmitter and receiver having N base station antennas, wherein said N base station antennas of the MIMO-based multiuser OFDM multiband of UWB base station communication transmitter and receiver are programmable and further wherein the fourth and/or fifth base station antennas can be turned off to avoid interference with wireless local area network (WLAN) devices, where N is an integer and greater than 5;
said N base station antennas are controllable;
said MIMO-based multiuser OFDM multiband of UWB base station communication transmitter and receiver coupled to an UWB network interface unit;
said UWB network interface unit coupled to an UWB network;
P MIMO-based OFDM multiband of UWB mobile communication transmitters and receivers, where P is an integer and greater than 1;
each of said P MIMO-based OFDM multiband of UWB mobile communication transmitters and receivers having Q mobile station antennas, where Q is an integer and greater than 1;
said Q mobile station antennas are controllable;
the number of said N base station antennas is greater than the number of said Q mobile station antennas; and
said P MIMO-based OFDM multiband of UWB mobile communication transmitters and receivers communicate with said MIMO-based multiuser OFDM multiband of UWB base station communication transmitter and receiver via a MIMO channel link.

17. The MIMO-based multiuser OFDM multiband of UWB communication system of claim 16 wherein said Q mobile station antennas of each of the MIMO-based OFDM multiband of UWB mobile communication transmitters and receivers are independent, identical and programmable antennas, where Q is an integer and greater than 1.

* * * * *